Oct. 4, 1949.  I. B. BENSEN  2,483,872
ELECTRON OPTICAL INSTRUMENT AND CAMERA THEREFOR
Filed Nov. 10, 1945  2 Sheets-Sheet 2
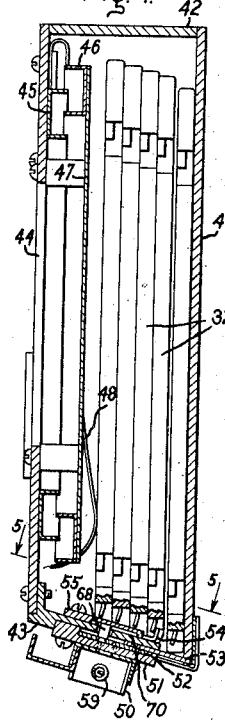
Inventor:
Igor B. Bensen,
by Merton D. Moore
His Attorney.

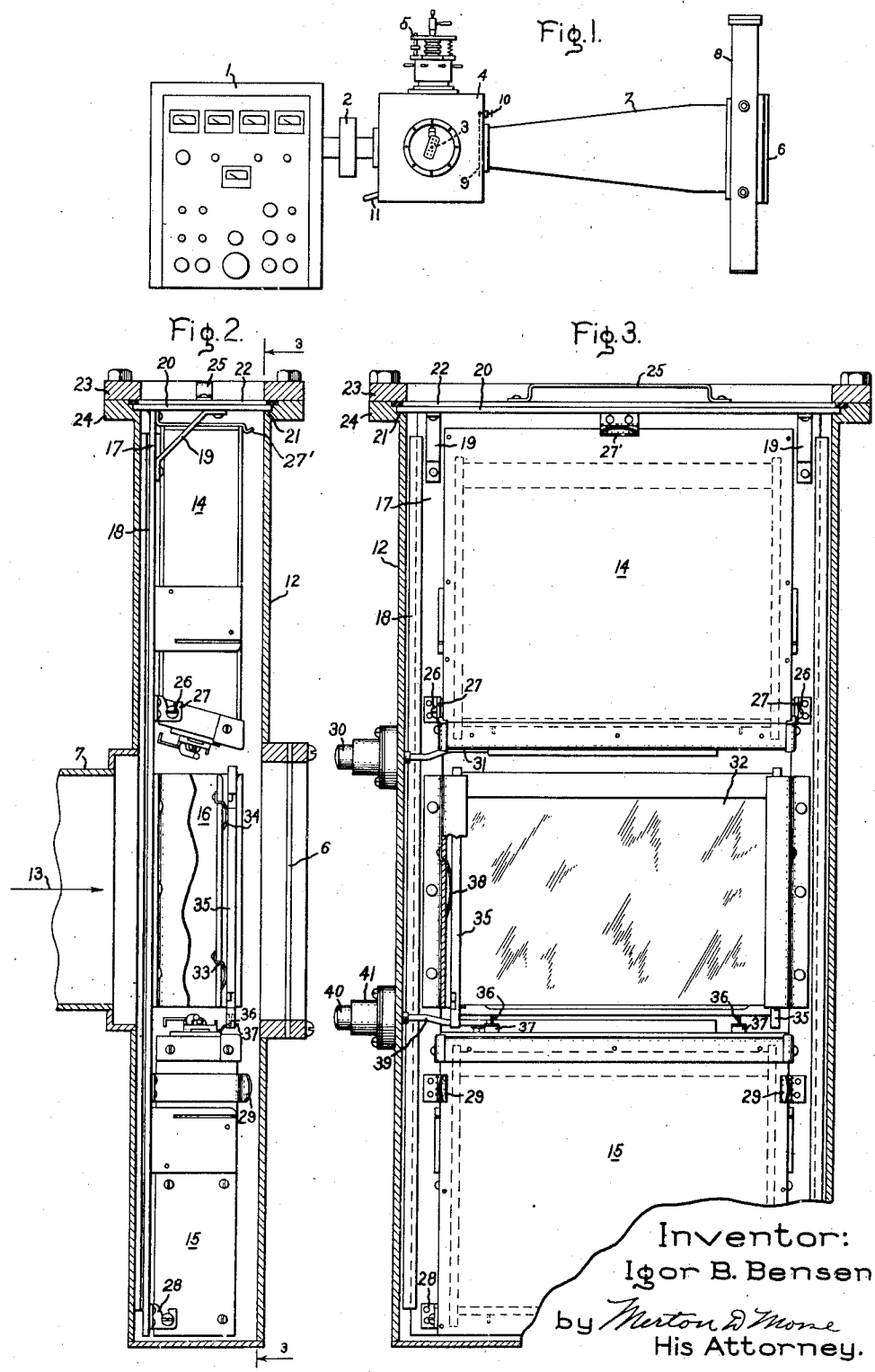

Patented Oct. 4, 1949

2,483,872

UNITED STATES PATENT OFFICE 2,483,872

ELECTRON OPTICAL INSTRUMENT AND CAMERA THEREFOR

Igor B. Bensen, Schenectady, N. Y., assignor to General Electric Company, a corporation of New York Application November 10, 1945, Serial No. 627,953

12 Claims. (Cl. 250—49.5)

My invention relates to apparatus for examining objects with the aid of electron beams, and particularly to cameras used in such apparatus.

In electron optical instruments, such as electron microscopes and electron diffraction instruments, it is customary to produce an enlarged image or a pattern, as the case may be, of an object being examined by causing a beam of high speed electrons to fall upon that object and, after transmission therethrough or reflection therefrom, to fall upon a fluorescent screen. It is desirable to record the images thus produced on a photographic plate for permanent record purposes. It is known that greater speed in photographing the images is obtained if the recording is done within the evacuated instrument and by intercepting the electronic beam on a photographic plate positioned intermediate the object being examined and the fluorescent screen. Since the complete structure must be highly evacuated, manipulation of the photographic plates within the evacuated structure for recording purposes, while yet permitting observance of the desired image on the fluorescent screen prior to recording, presents problems the solution of which forms a primary object of my present invention.

It is another object of my invention to provide a new and improved camera for recording information obtained by electron optical means.

It is a further object of my invention to provide a camera in an evacuated structure and means external to the evacuated region for sequentially placing a photographic plate into a recording position and removing it from that position.

It is still another object of my invention to provide a new and improved storage chamber for photographic plates.

It is a still further object of my invention to provide a new and improved magazine or supply chamber for a camera in which photographic plates stored therein are ejected singly and the remaining plates in the chamber are removed sequentially to an ejecting position.

It is still another object of my invention to provide a new and improved electron optical instrument provided with both a fluorescent viewing screen and means intermediate the screen and an object being examined for photographing the electron images or patterns produced.

Briefly stated, in one form of my invention a camera is provided within an electron diffraction instrument and consists of a magazine supported above the optical axis of the instrument and provided with an external control for ejecting photographic plates into a plane normal to the optical axis and additional external means for removing the plates from such position and positioning the plates, after exposure, in a storage chamber located below the optical axis.

A feature characterizing the invention is the maintaining of photographic plates in a plane normal to the optical axis of the instrument and allowing the plates to fall by gravity in successive steps from the magazine to an exposure position and ultimately to a storage chamber.

The features of my invention which I believed to be novel are set forth with particularity in the appended claims. My invention itself, however, both as to its organization and method of operation, together with further objects and advantages thereof may best be understood by reference to the following description taken in connection with the accompanying drawings in which Fig. 1 is a front elevation view of an electron diffraction instrument including the camera of my invention; Figs. 2 and 3 are side and front views, partly in cross-section, of a camera employed in the instrument of Fig. 1; Fig. 4 is a side elevation view, partly in section, of the magazine or supply chamber employed in the camera of Fig. 2; Fig. 5 is a section view along the lines 5—5 of Fig. 4, and Fig. 6 illustrates the mechanism of Fig. 5 in an operated condition; Fig. 7 is a bottom view of the magazine of Fig. 4; Fig. 8 is a side view, partly in section, of the photographic plate storage chamber employed in the camera of Fig. 2; Figs. 9 and 10, respectively, illustrate an operating mechanism of the storage chamber of Fig. 8 in closed and open position; and Fig. 11 is a section view of Fig. 9 taken along the line 11—11.

Referring to Fig. 1, I have there shown an electron diffraction instrument which includes an operating panel 1 behind which is disposed an electron gun or filamentary source of electrons. The electrons emitted from the gun are focussed by means of a focussing yoke 2 to be reflected from an object to be examined and supported upon a suitable specimen support 3. The specimen support 3 is contained within a specimen chamber 4 and its position may be adjusted by means of a manipulator 5 through three mutually perpendicular directions, as well as two axes of rotation. A manipulator of this type is described in my application, Serial No. 627,952, now Patent 2,440,067, filed concurrently herewith.

The electron beam, after reflection from the specimen being examined, is allowed to fall upon a fluorescent screen 6 supported at the end of a container 7. The electron beam, when it falls upon the fluorescent screen 6, forms a diffraction pattern thereon. In order that the pattern thus formed may be permanently recorded, a camera 8 is provided, the construction of which is pointed out in greater detail hereinafter. Means are provided for intercepting the electron beam while the photographic plate is being lowered into a plane perpendicular to the optical axis of the diffraction instrument. This means comprises a shutter 9, externally manipulated by a control handle 10, which may be moved into and out of the path of the electron beam. The entire instrument including the specimen chamber 4 and the camera 8 may be highly evacuated by any suitable means, such as a vacuum pump (not shown) and which may be connected to the instrument through a tubulation 11.

Referring now to Figs. 2 and 3 jointly, I have there shown the camera of my invention as comprising a vertical rectangular container 12 which connects with the container 7 and which extends in a direction perpendicular to the axis of the electron beam indicated by the arrow 13. The camera 8 comprises a magazine or supply chamber 14, a storage chamber 15, and a plate supporting mechanism 16 arranged intermediate the members 14, 15. The members 14–16 are supported from a vertical frame member 17 which is arranged to slide in a supporting channel or slide 18. Rigidly attached to the vertical member 17, as by means of the supporting bracket 19, is a top or closure member 20. The closure member 20 is arranged to fit in a shoulder 21 at the upper end of the vertical container 12 and is sealed by means of a rubber gasket 22 and a flange 23 bolted to a cooperating flange 24 at the upper end of the container 12. The cover 20 preferably is provided with a handle 25 by means of which the members 14–16 may be withdrawn as a unit from the container 12.

The magazine 14 is provided near the lower edge of its sides with a pair of screws 26 which are adapted to fit into a hangar 27 attached to the support 17. At its upper end, the magazine 14 is retained in a vertical position by means of a spring clip 27' adapted to engage the outer edge of the magazine. Similarly, the storage chamber 15 is adapted to be supported at its lower end by a pair of hangars 28 and, at its upper end, by a pair of spring clips. The photographic plates contained within the magazine 14 may be ejected singly by means of an externally accessible push button control 30 which actuates an operating rod 31 attached to the lower end of the magazine 14. After being ejected from the magazine 14 in a manner to be described later, a photographic plate 32 is allowed to fall by gravity to a position perpendicular to the electron beam 13. It is retained in this position by means of a pair of guides 33 and a plurality of springs 34 which engage the front surface of the side rails 35 of a frame or holder which surrounds the photographic plate 32. The holder is provided at its lower edge with a pair of pins 36 which rest upon movable supports 37. The photographic plate is centered by means of a pair of springs 38 which engage the side edges of the rails 35. The storage chamber 15 is likewise provided with an operator 39 for moving the supports 37 to lower the plate 32, after exposure, into the storage chamber 15 in a manner described hereinafter. External means are provided for actuating the operator 39 and comprises a push button 40 supported on the frame 12 and mechanically linked with the operator 39 through a vacuum-tight seal 41.

The magazine or photographic plate supply chamber 14 is shown in cross-section in Fig. 4 and comprises a rectangular metallic box 42 having a inclined bottom 43 and a light-tight side wall 44 having a central aperture. The side wall 44 supports a pair of spaced channel members 45, 46 and a light impervious wall 47 supported on the channel 46 is spaced from wall 44 so that light passing through the central aperture in wall 44 cannot reach the interior of the magazine. The central aperture preferably is sufficiently large that the magazine may be evacuated rapidly when it is positioned in an electron diffraction instrument. The wall 47 prevents light from reaching the plates 32 when the magazine is removed from the instrument. The magazine 14 is adapted to receive a plurality of photographic plates 32 and is provided with a pair of flat springs 48 which engage the side rails 35 of the plate holders to maintain the plates and their associated holders pressed against the right-hand wall 49 of the magazine.

The inclined bottom of the magazine is provided with an operating mechanism which comprises a plurality of superposed members comprising a channel 50 movable by operating rod 31, a retainer plate 51, a movable plate member 52, a closure member 53, a plate restraining member 54, and an additional retainer 55.

The relation of the operating members for ejecting a photographic plate from the magazine 14 is best understood by reference to Figs. 5–7, inclusive, in which Fig. 5 shows the mechanism with the closure member 53 in its closed position and Fig. 6 shows the closure member 53 in its open position. Fig. 7 shows a bottom view of the operating mechanism. In the operating mechanism, the operating rod 31 is affixed to the channel member 50 which is provided with a pair of tongues 56, 57 which fit into the slotted retainer plates 51 fastened by means of screws 58 to the bottom wall 43. The channel 50 is biased toward the right-hand position, as seen in Fig. 7, by means of a spring 59 which is attached between a stiffener 60 at the left-hand end of the channel 50 and a stud 61 attached to the right-hand retainer plate 51. Also attached to the channel 50 is a thumb operator 62 by means of which the closure member 53 may be operated when the magazine is being filled with photographic plates. The channel 50 is likewise provided with an aperture adapted to receive a pin 63 which is affixed to the movable plate member 52 and which passes through a slot 64 in a retainer plate 65 attached to the bottom wall 43 and interposed between the channel member 50 and the movable plate 52. The movable plate 52, in turn, is provided with a pair of parallel slots 66 inclined at an angle to the direction of motion of the channel 50 and the movable plate 52. The slots 66 are adapted to receive pins 67 attached to the closure member 53. Thus, it is seen that, when the operating rod 31 is moved to the left to move the channel 50 and the pin 63, the movable plate 52 is likewise moved to the left and the slots 66 engaging the pins 67 move the closure member to its open position seen in Fig. 6.

The movable plate 52 likewise is provided with an aperture to receive a pin 68 which is attached to the plate restraining member 54 and passes through a slot 69 in the bottom wall 43. The plate restraining member 54 is limited to transverse motions by means of the retainer 55 which is screwed to the bottom wall 43 and which is provided with a longitudinal slot 70 to receive the plate restraining member 54. Likewise, the closure member 53 is provided with a notch 71 which is adapted to receive the pin 68 during the operation of the closure member and the plate restraining member and which functions as a stop to limit the motion of the operating mechanism in the left-hand direction. The plate restraining member at its two ends is provided with upturned edges 72 which are adapted to pass behind the pins 36 of the second plate in the magazine and to move the second and all other plates to the back of the magazine, releasing pressure on the plate adjacent the wall 49.

In the complete operation of the magazine operating mechanism to eject a photographic plate, the operating rod 31 by movement of the channel 50 to the left moves the pin 63 on the movable plate 52. The slots 66 in the plate 52 engage pins 67 on the closure member 53 to move this closure member to the rear, thus leaving the plate holder adjacent wall 49 unsupported against vertical movement. At the same time, the pin 68, which fits into the member 52 and is attached to the plate restraining member 54, moves the up-turned edges 72 to engage the pins 36 at the bottom of the second plate holder and to move this plate and the remaining plates to the rear of the magazine, releasing the lateral pressure on the first plate of the magazine. As a consequence, the first plate in the magazine is no longer supported and drops freely through the opening in the bottom of the magazine into the guides 33 at the position shown in Fig. 3. When pressure on the operating rod 31 is released, the spring 59 causes the channel 50 to return to its normal position and the closure member 53 to close the opening in the bottom wall 43. At the same time, the up-turned edges 72 are moved to the right, releasing the pins 36 on the next plate of the magazine. The flat springs 48 press the remaining plates to the right, causing the last plate to be placed in an ejecting position.

The storage chamber 15 for exposed plates is shown in cross-sectional view in Fig. 8 and is similar in construction to the magazine 14, with the exception that the operating mechanism is at the top of the chamber and both the top and bottom walls are in a horizonal position. The light-tight construction of the left wall is similar to that of the magazine 14 and similar elements are identified by similar reference numerals differentiated by priming. The storage chamber 15 is likewise provided with a flat spring 48' for placing the plates against the left-hand wall 73 of the storage chamber. The operating mechanism for the closure member 74 is similar to that employed in connection with the magazine, with the exception that the plate restraining member 54 and its operating mechanisms are not required. Another additional feature of the closure operating mechanism of the storage chamber is the supports 37 which are attached to the closure member 74 and are moved to the left, as seen in Fig. 8, when the channel 50' is moved to the rear to open the storage chamber to permit a photographic plate to fall into the storage chamber.

Since the plates in the storage chamber are pressed toward the right wall 73 by the flat springs 48', I provide means connected with the closure operating mechanism to move the plates within the chamber to the rear to permit the entrance of a new plate. This means comprises a toggle mechanism consisting of a lever 75 pivoted about a stud 76 in the side wall of the storage chamber. At its upper end, the lever 75 is provided with a tongue 77 which fits into a groove in the closure plate 74. Intermediate the tongue and the pivot 76, the lever 75 has attached to it a slide 78 which fits into a groove 79 in the side wall of the storage chamber. The slide 78 is formed of a spring material and is provided at its right-hand end with a hook 80 which is adapted to slide over the inclined surface of a notch 81 provided in the side rail 35 of the photographic plate holder. A similar slide 78 and groove 79 are provided at the lower end of the magazine to engage a second notch 81 on the side rail 35. The lower slide 78 is operated by a lever 82 pivoted about a stud 83 and which has a socket 84 for receiving a ball joint 85 at the lower end of the lever 75. In the operation of the mechanism for opening the storage chamber 15 to permit entrance or removal of a photographic plate, when the operating rod 39 is pressed, the channel 50' through the associated mechanism moves the closure member 74 to the left, as seen in Figs. 8–11, thus forming an opening through which a plate may enter the storage chamber. At the same time, the lever 75 is moved to the left, causing the slide 78 and the hook 80, which engages a notch 81, to move the plates present in the storage chamber to the rear against the pressure of spring 48'. When the pressure on the operating rod 39 is removed, the spring 59' causes the channel 50' to move to the front in the views shown and the closure member 74 to close the storage chamber. At the same time, the slides 78 move to the right, causing the flexible hook 80 to slide over the inclined surface of the notch 81 of the plate adjacent wall 73 and to engage that notch preparatory to moving this plate to the rear upon next operation of the closure mechanism.

An important advantage of my new and improved camera is that it is easily inserted and withdrawn from a region to be evacuated. Furthermore, the magazine and storage chamber are provided with light-tight arrangements to facilitate evacuation of the region within the respective chambers. The magazine and storage chamber are formed as light-tight boxes which may be loaded or unloaded, as the case may be, in a usual dark room and thereafter require no special handling.

Since the photographic plates are allowed to proceed by gravity from the magazine to exposure position and, subsequently, to storage chamber, the external operating mechanism for the camera is relatively simple and requires no extensive sealing or elaborate manipulators.

Operation of the improved electron diffraction instrument incorporating my improved camera is facilitated by including the shutter 9 to cut off the electron beam when a desired pattern or image is obtained on the fluorescent screen and during the period when a photographic plate is being lowered into proper position prior to exposure. Since the camera is entirely enclosed within the evacuated region, the exposure time is necessarily reduced to a minimum.

While I have shown particular embodiments of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. In a camera for use in an evacuated region and having an optical axis arranged in a substantially horizontal position, a container adapted to be evacuated, a photographic plate supply chamber supported within said container in a position above said axis and a plate storage chamber positioned within said container below said axis, each of said chambers having closure means therein and being arranged to hold a plurality of photographic plates therein, each of said chambers having a plurality of imperforate walls and a perforate wall to provide substantially free circulation of air between said container and the chamber to facilitate evacuation thereof, means for operating the closure means of said supply chamber to release a plate from said supply chamber to fall by gravity to a position normal to said axis, means including means connected with the closure means of said storage chamber supporting said plate in said normal position, and means including means for operating the closure members of said storage chamber for releasing said plate from said normal position.

2. In a camera for use in an evacuated region and having an optical axis arranged in a substantially horizontal position, a container adapted to be evacuated, a photographic plate supply chamber supported within said container in a position above said axis, means ejecting a first plate from said chamber to fall by gravity to a position substantially normal to said axis and for moving a second plate to an ejecting position, means including a storage chamber positioned within said container below said axis for supporting said first plate in said normal position, and means releasing said first plate from said normal position to fall by gravity into said storage chamber, each of said chambers being constructed and arranged to provide free circulation of air between said container and the chamber to facilitate evacuation thereof.

3. In a camera for use in an evacuated region and having an optical axis arranged in a substantially horizontal position, a container adapted to be evacuated, a vertical supporting means arranged within said container, a photographic plate supply chamber supported by said vertical means in a position above said axis, a plate storage chamber supported by said vertical means in a position below said axis, means for transferring a plate by gravity from said supply chamber to a position normal to said axis, and additional means for transferring said plate by gravity from said normal position to said storage chamber, each of said chambers being constructed and arranged to provide free circulation of air between said container and the chamber to facilitate evacuation thereof.

4. In an electron optical instrument of the type having an evacuated chamber having an axis along which a beam of electrons is projected, a camera arranged to be removably positioned in said chamber, said camera comprising a photographic plate supply chamber supported above said axis and a storage chamber positioned below said axis, means external to said evacuated chamber for transferring a plate from said supply chamber to a position normal to said axis, and additional means external to said evacuated chamber for transferring said plate from said normal position to said storage chamber, said supply and storage chambers each being constructed and arranged to provide free circulation of air between the region therewithin and said evacuated chamber.

5. In an electron optical instrument of the type having an evacuated chamber having an axis along which a beam of electrons is projected, a viewing screen supported at one end of said chamber, a camera positioned in said chamber adjacent said viewing screen, said camera comprising means supporting a photographic plate above said axis, means external to said chamber for transferring said plate from said position to a position normal to said axis and in front of said screen, and additional means external to said chamber for transferring said plate from said normal position to a position below said axis, said camera being constructed and arranged to provide substantially free circulation of air between said chamber and a photographic plate for all positions of the latter.

6. In an electron optical instrument including an evacuated chamber having an axis along which a beam of electrons is projected, a viewing screen supported at one end of said chamber, a camera positioned in said chamber adjacent said viewing screen, said camera comprising means supporting a photographic plate above said axis, means external to said chamber for transferring said plate from said position to a position normal to said axis and in front of said screen, additional means external to said chamber for transferring said plate from said normal position to a position below said axis, and means for intercepting said beam of electrons, whereby said beam may be interrupted while said plate is being transferred between said positions said camera being constructed and arranged to provide substantially free circulation of air between said chamber and a photographic plate for all positions of the latter.

7. A discharging container for photographic plates comprising an enclosing structure adapted to be evacuated and comprising a plurality of imperforate walls and a perforate wall, an imperforate member in spaced relation with said perforate wall and forming a light-tight seal therewith, said structure having an inclined bottom wall having an aperture at its lowest point, resilient means for moving a photographic plate in said container down said inclined wall toward said aperture, said bottom wall including a movable closure member for said aperture, an operating mechanism for said closure member comprising a member movably supported on said bottom wall, and means connecting said movable member and said closure member for moving said closure member to uncover said aperture, whereby a plate in said container falls by gravity through said aperture.

8. A discharging container for photographic plates of the type having a rectangular supporting frame and a pin on an edge of said frame comprising an enclosing structure adapted to be evacuated and comprising a plurality of imperforate walls and a perforate wall, an imperforate member in spaced relation with said perforate wall and forming a light-tight seal therewith, said structure having an inclined bottom wall having an aperture at its lowest point, said plates being arranged vertically in parallel relation in said container with said pins adjacent said inclined wall, said bottom wall including a movable closure member for said aperture, an operating mechanism for said closure member comprising a member movably supported on said bottom wall, means connected with said member and operated thereby for engaging the pin of the second lowest plate in said container, and means connecting said movably supported member and said closure member for moving said closure member to uncover said aperture, whereby the lowest plate only in said container falls by gravity through said aperture.

9. A discharging container for photographic plates having a rectangular supporting frame and a pin on an edge of said frame comprising an enclosing structure adapted to be evacuated and comprising a plurality of imperforate walls and a perforate wall, an imperforate member in spaced relation with said perforate wall and forming a light-tight seal therewith, said structure having an inclined bottom wall having an aperture at its lowest point, resilient means within said structure for moving a plurality of plates within said container to the lowest point of said inclined wall, said plates being arranged vertically in parallel relation in said container with said pins adjacent said inclined wall, said bottom wall including a movable closure member for said aperture, an operating mechanism for said closure member comprising a member movably supported on said bottom wall, means connected with said last member and operated thereby for engaging the pin of the second lowest plate in said container, and means connecting said last member and said closure member for moving said closure member to uncover said aperture, whereby the lowest plate in said container falls by gravity through said aperture.

10. A storage chamber for plate-like articles comprising an enclosing structure adapted to be evacuated comprising a plurality of imperforate sides and a perforate side, an imperforate member in spaced relation with said perforate side to form a light-tight seal therewith, said structure having a wall having an aperture therein, a closure member for said aperture, operating means for moving said closure member to uncover said aperture, means normally biasing a plate-like article within said chamber into alignment with said aperture, and means operated by said operating means for moving said article out of alignment with asid aperture whereby an additional article may be introduced into said chamber.

11. A storage chamber for photographic plates of the type having a rectangular supporting frame and including a notch at the outer edge of said frame comprising an enclosing structure adapted to be evacuated comprising a plurality of imperforate sides and a perforate side, an imperforate member in spaced relation with said perforate side to form a light-tight seal therewith, said structure having a top wall having an aperture therein, a closure member for said aperture, operating means carried by said top wall for moving said closure member to uncover said aperture, resilient means within said chamber for moving a photographic plate therein in alignment with said aperture, and means operated by said operating means and including a finger linked to said operating means and movable therewith, said finger being positioned to engage said notch on said plate and upon movement of said operating means to move said plate out of alignment with said aperture, whereby an additional photographic plate may be introduced into said chamber.

12. A storage chamber for photographic plates of the type having a rectangular supporting frame and a notch on said frame comprising a light-tight enclosure adapted to be evacuated and comprising a plurality of imperforate sides and a perforate side, an imperforate member in spaced relation with said perforate side to form a light-tight seal therewith, said enclosure having an end wall having an aperture therein, a closure member normally biased to cover said aperture, operating means for moving said closure member to uncover said aperture, and means connected with said operating means positioned to engage the notch of a photographic plate within said chamber and to move said plate out of alignment with said aperture upon movement of said operating means, whereby an additional plate may be introduced into said chamber.

IGOR B. BENSEN.

REFERENCES CITED

The following references are of record in the file of this patent:

UNITED STATES PATENTS

| Number | Name | Date |
| --- | --- | --- |
| 236,373 | Spilman | Jan. 4, 1881 |
| 478,780 | Bristol | July 12, 1892 |
| 1,059,488 | Rosenthal | Apr. 22, 1913 |
| 1,621,619 | Ashe | Mar. 22, 1927 |
| 2,107,825 | Humphreys | Feb. 8, 1938 |
| 2,118,449 | Wantz | May 24, 1938 |
| 2,215,979 | Schuchmann | Sept. 24, 1940 |
| 2,260,041 | Mahl et al. | Oct. 21, 1941 |
| 2,281,325 | Ramo | Apr. 28, 1942 |
| 2,355,538 | Cameron | Sept. 9, 1944 |
| 2,380,345 | Tait | July 10, 1945 |
| 2,382,739 | Muller | Aug. 14, 1945 |
| 2,392,243 | Hillier | Jan. 1, 1946 |